UNITED STATES PATENT OFFICE.

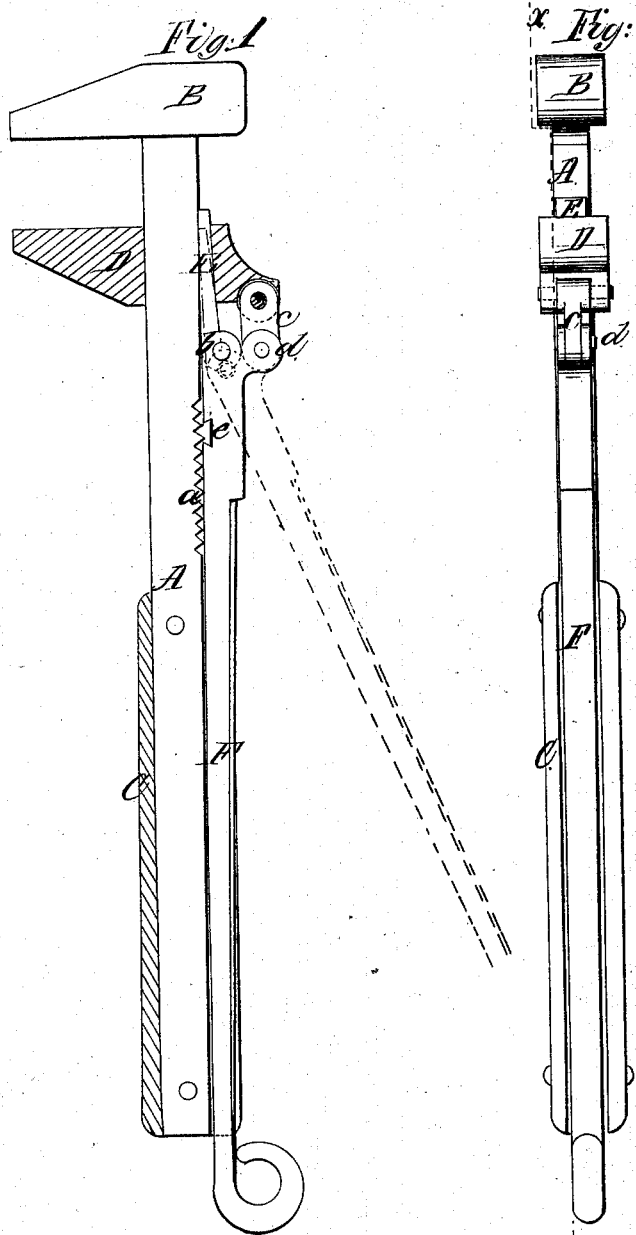

A. J. BELL, OF GREENSBURG, KENTUCKY.

WRENCH.

Specification of Letters Patent No. 26,468, dated December 20, 1859.

*To all whom it may concern:*

Be it known that I, A. J. BELL, of Greensburg, in the county of Greenup and State of Kentucky, have invented a new and Improved Wrench; and I do hereby declare that the following is a full, clear, and exact description of the same, reference being had to the annexed drawings, making a part of this specification, in which—

Figure 1 is a side sectional view of my invention, taken in the line $x$, $x$, Fig. 2. Fig. 2 an edge view of ditto.

Similar letters of reference indicate corresponding parts in the two figures.

This invention consists in attaching a jointed lever to the movable or sliding jaw of the wrench and having a wedge connected to said lever and a tooth, the stem of the wrench being serrated or toothed and the whole arranged substantially as hereinafter shown, whereby a very strong, and durable wrench is obtained, and one that may be readily adjusted to suit various sized nuts.

To enable those skilled in the art to fully understand and construct my invention I will proceed to describe it.

A, represents a bar or stem which is of rectangular form, has a jaw B, secured permanently to its upper end. The lower part of the bar or stem is inserted in a wooden handle C, and its back edge just above the handle is serrated to form a rack $a$, as shown clearly, in Fig. 1.

On the bar or stem A, a sliding jaw D, is placed and allowed to slide freely up and down. The opening in this jaw through which the bar or stem passes is larger than a transverse section of bar A, sufficiently so to receive a wedge E, the inner end of which is connected by a joint $b$, to a lever F, which is connected by a link $c$, to the back end of the jaw D. The wedge E, and link $c$, are parallel with each other and the joint connection $d$, of the link $c$, to the lever forms a fulcrum for the lever. At the inner side of the lever F, there is a tooth $e$, which, when the lever is closed or adjusted to the bar or stem, fits into the rack $a$, as shown in Fig. 1.

The lever F, is somewhat larger than the bar or stem A, in order that it may be readily grasped by the hand.

The implement is used as follows: The lever F is drawn out from the bar or stem A, with one hand, while the bar or stem is held by the other, and the jaw D, may then be moved on the bar or stem, and adjusted to the nut. The lever F, is then shoved to the bar or stem and the tooth $e$, catches into the rack $a$, and the wedge E, is forced upward between the bar or stem and the jaw D, firmly securing the jaw to the bar or stem. The lever F, when closed against the bar or stem A, greatly adds to its strength and the greater the power applied to the stem the tighter the jaw is held and the less liable the tooth $e$, to slip from the rack $a$.

Having thus described my invention, what I claim as new and desire to secure by Letters Patent, is—

The combination of the jointed lever F, wedge E, and tooth ($e$) with the sliding jaw D, and bar A, as and for the purpose herein shown and described.

A. J. BELL.

Witnesses:
  D. H. MEARS,
  HUGH MEARS.